United States Patent
Fraenkel et al.

(10) Patent No.: US 7,069,550 B2
(45) Date of Patent: Jun. 27, 2006

(54) DELEGATION-BASED CLASS LOADING OF CYCLICALLY DEPENDENT COMPONENTS

(75) Inventors: Michael L. Fraenkel, Raleigh, NC (US); Brian Keith Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 10/026,266

(22) Filed: Dec. 21, 2001

(65) Prior Publication Data

US 2003/0121031 A1    Jun. 26, 2003

(51) Int. Cl.
G06F 9/44    (2006.01)

(52) U.S. Cl. ..................................... 717/166
(58) Field of Classification Search ................. 717/166
See application file for complete search history.

(56) References Cited

U.S. PATENT DOCUMENTS

| | | | | |
|---|---|---|---|---|
| 6,063,128 | A * | 5/2000 | Bentley et al. | 703/6 |
| 6,601,114 | B1 * | 7/2003 | Bracha et al. | 719/332 |
| 2002/0129177 | A1 * | 9/2002 | McGuire et al. | 709/315 |
| 2003/0009751 | A1 * | 1/2003 | White | 717/166 |
| 2003/0163481 | A1 * | 8/2003 | Blohm | 707/102 |
| 2004/0015936 | A1 * | 1/2004 | Susarla et al. | 717/166 |

OTHER PUBLICATIONS

Gong, Li; "Secure JAVA Class Loading", p. 56-61, IEEE 1998, retrieved Sep. 13, 2004.*

Kniesel, Gunter; Costanza, Pascal; "JMangler-A Framework for Load-Time Transformation of JAVA Class Files", Nov. 2001 IEEE, retrieved Sep. 13, 2004.*
McCrary, Ken; "Create a custom JAVA 1.2-style ClassLoader", <URL: www.javaworld.com/javaworld/jw-03-2000/jw-o3-classload.html>, retrieved from a google.com search Sep. 13, 2004.*
Qian, Zhenyu; Goldberg, Allen; Coglio, Alessandro; "A Formal Specification of JAVA Class Loading", p. 325-336, 2000 ACM, retrieved Sep. 13, 2004.*
K. McCrary, *Create A Custom Java 1.2-Style ClassLoader*, JavaWorld (Mar., 2000).
C. McManis, *The Basics of Java Class Loaders*, JavaWorld (Oct. 1996).

* cited by examiner

*Primary Examiner*—Wei Zhen
*Assistant Examiner*—Mary Steelman
(74) *Attorney, Agent, or Firm*—A. Bruce Clay, Esq.; Steven M. Greenberg, Esq.; Christopher & Weisberg, P.A.

(57) ABSTRACT

A custom class loader configured to dynamically locate and load classes in a virtual machine in accordance with an associated dependency specification. The custom class loader can include class loading logic configured to specifically and dynamically locate, define and load a class specified by name. The custom class loader also can include a list of peer class loaders arranged in a peer-to-peer fashion in accordance with the associated dependency specification in the virtual machine. In this regard, list generation logic can be included which can generate the list when the specified class has been replaced. Finally, the custom class loader can include deference logic configured to defer the location, definition and loading of the specified class to the peer class loaders in the list.

20 Claims, 3 Drawing Sheets

DELEGATION-BASED CLASS LOADING OF CYCLICALLY DEPENDENT COMPONENTS

BACKGROUND OF THE INVENTION

1. Statement of the Technical Field

The present invention relates to the field of server-side object-oriented programming and more particularly to custom class loaders.

2. Description of the Related Art

The class loader mechanism forms part of the foundation of the modern, virtual machine. In particular, class loaders provide the translation technology which can convert serialized byte code into named classes for execution in the virtual machine. Notably, class loaders can perform this conversion regardless of the storage means and location of the byte code. As a result, the virtual machine need not know the operational specifics associated with the file systems storing the byte code.

In conventional runtime environments like the JAVA Runtime Environment (JAVA is a trademark of Sun Microsystems of Palo Alto, Calif., United States), which enables the use and operation of computer programs coded according to the Java programming language utilizing a Java runtime environment, classes can be introduced when they are referenced by name in a class that already is executing within the runtime environment. While the entry point class of an application can require some individual processing exclusive of the class loading mechanism, subsequent attempts at loading other classes are performed exclusively by the class loader.

At its simplest, a class loader creates a flat name space of class bodies that are referenced by a string name. For example, in the case of the Java runtime environment, a class loading definition might include:

Class myclass=loadClass(String className, boolean
        resolveclass);

In this exemplary implementation of the loadClass( ) method, the variable className encapsulates a string which is understood by the class loader to uniquely identify a stored class implementation. The variable resolveclass, by comparison, is a flag which when set notifies the class loader that classes referenced by the class associated with the class name should be resolved. That is, any class referenced by the class associated with the class name should be loaded as well.

In the Java runtime environment, the virtual machine can include one class loader embedded within the virtual machine. Referred to as the "primordial" class loader, this embedded class loader automatically resolves references to class names by reference to a specified repository of trusted classes which can be run by the virtual machine without verification. Notably, in the primordial class loader, a default implementation of the loadClass( ) method can be implemented.

Earlier class loading technology permitted developers to load classes from a variety of disparate locations, including file systems, remote hosts, and the like. Yet, this type of flexibility carried the price of complexity. For example, prior to the Java 1.2 environment, customized class loaders required the implementation of the abstract loadClass( ) method. As one skilled in the art will recognize, however, the implementation of the loadClass( ) method involves significant processing, including for instance the process steps of checking whether the named class has already been loaded either by the custom class loader or the primordial loader, loading the class from the repository, defining the class, resolving the class and returning the class to the calling method.

The specification of the Java 1.2 environment, however, reduced this complexity using a parent/child delegation model in which each customized class loader delegates class loading to its parent class loader—e.g. the class loader from which the customized class loader had been sub-classed. Notably, the parent class loader either can be another customized class loader or the primordial class loader. In any case, where the parent class loader cannot load a specified class, the sub-class can attempt to locate and load the specified class using the findClass( ) method. Hence, the customized class loader is responsible only for loading those classes which are not available to the parent class loader.

Application servers permit application isolation through extensive use of customized class loading. In particular, in the virtual machine environment, each class can be defined by a class name and the class loader which loaded the class. Hence, a class can be loaded only once by a given class. Still, the same class can be loaded multiple times using separate class loaders within the same virtual machine. As a result, applications can be isolated in the virtual machine. Moreover, different versions of the same class can be utilized in different applications simultaneously.

Problems can arise, however, where classes are inter-dependent upon one another. In particular, to avoid type mismatch problems which can arise where inter-dependent classes refer to separate instances of co-dependent classes, it is imperative that each class possess a common view of their co-dependent classes. In order to overcome this problem, each inter-dependent class can rely upon a proper implementation of a class loading delegation policy facilitated by dependency definitions. Typically, these dependency definitions can be specified in a manifest file which can be accessed as part of an application archive such as a Java JAR file. Still, cyclic dependencies between classes remain problematic.

To handle cyclic dependencies, conventional custom class loaders track those class loaders which have already been visited thereby avoiding multiple class loading cycles. Notwithstanding, class loading in of itself is a computationally expensive proposition. Additionally, separately tracking the visitations of each class loader can exacerbate an already tedious process. Conventional class loaders typically address this problem by collapsing all of the dependencies into a single class loader.

Such a combination, however, can corrupt the intended dependency ordering of the component class loaders. Furthermore, replacing individual ones of the cyclically dependent classes would require the replacement of the combined class loader rather than merely the class loader associated with the replaced class. Finally, combining the class loaders into a single, combined class loader negates the advantage of application isolation provided by deploying multiple, independent class loaders.

SUMMARY OF THE INVENTION

The present invention is a custom class loader configured to dynamically locate and load classes in a virtual machine in accordance with an associated dependency specification. Notably, unlike parent/child dependencies of prior art class loading technologies, in the present invention, a list of class loaders describing peer-to-peer dependencies between classes can be used to determine the ordering of class loader operations. Hence, the peering arrangement of the present invention included in the dependency specification permits a more flexible arrangement of class loading delegation.

The custom class loader can include class loading logic configured to specifically and dynamically locate, define and load a class specified by name. The custom class loader also can include a list of peer class loaders arranged in accordance with the associated dependency specification of the virtual machine. In this regard, list generation logic can be included which can generate the list when the specified class has been replaced. Finally, the custom class loader can include deference logic configured to defer the location, definition and loading of the specified class to peer class loaders in the list.

Importantly, the custom class loader can include a flag indicating whether the class has been replaced. In one aspect of the invention, the flag can be a dirty bit. Still, the invention is not limited in regard to the manner in which the custom class loader can determine whether an associated class has been replaced. In another aspect of the invention, the custom class loader can conform to the specification of a Java[™] version 1.2 delegation-style custom class loader.

In a preferred embodiment, the custom class loader can execute in a virtual machine. In the preferred embodiment, the custom class loader can perform a method of coordinating class loading among cyclically dependent classes. The method can include the steps of receiving a request to load a specified class; and, determining whether the specified class has been replaced. If it is determined that the specified class has been replaced, a new instance of the class loader can be constructed and a list of peer class loaders can be generated to which location, definition and loading of the specified class are to be deferred in accordance with a dependency specification of the virtual machine. Finally, the location, definition and loading can be deferred to the peer class loaders in the list.

Notably, the determining step can inspect the dirty bit in the class loader. In particular, the dirty bit can be set responsive to the specified class being replaced. Moreover, each dirty bit in each peer class loader referenced in the list can be set responsive to the specified class being replaced. In this way, those class loaders implicated by the replacement of the cyclically dependent class can be re-constructed.

Importantly, the dependency specification can include a tree of nodes. Each node can encapsulate a reference to a dependency of the specified class. One of the nodes can encapsulate a reference to the specified class. In regard to the generating step, beginning with the one node encapsulating a reference to the specified class, each node in the dependency specification can be traversed using a depth-first traversal strategy until encountering either a leaf node or a node encapsulating a reference to a dependency already referenced in the list. Once encountering either the leaf node or the node encapsulating a reference to a dependency already referenced in the list, each node in the dependency specification can be traversed using a breadth-first traversal strategy until encountering the node encapsulating the reference to the specified class. In both cases, however, a reference can be added to the list for each traversed node.

Alternatively, the generating step can include traversing each peer class loader associated with the class loader through to a primordial class loader. A reference can be added to the list for each traversed peer class loader. In this regard, the generating step can further include adding at least one reference to a peer class loader to the list based upon a corresponding reference stored in a list of peer class loaders identified in one of the traversed peer class loaders.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a custom class loading method and system which can efficiently process cyclically dependent classes in a virtual machine environment. In accordance with the inventive arrangements, each class loader in the system can include a list of peer class loaders. The list of peer class loaders can include those peer class loaders which are to be visited according to a dependency specification of an associated application in the virtual machine environment. Prior to constructing each class loader, the peer class loader list can be generated by traversing each dependency referred to in the dependency specification.

Each class loader also can include a "dirty bit". The dirty bit can indicate when a new class loader should be created by virtue of a newly replaced class which is associated with the class loader. When the dirty bit of a class loader has been set, each class loader in the class loader list also can have the dirty bit set. Additionally, when a class loader is encountered which has the dirty bit set, a new class loader can be created. Notably, the dirty bit permits the deferral of class loader construction in order to reduce runtime overhead.

The class loader list, once generated, guarantees that there will be a well known class loader ordering despite the cyclic references of the inter-dependent classes. Furthermore, the peer arrangement of the class loader list frees the class loading order from the restrictive parent/child arrangement of the prior art. Hence, the combination of the peer class loader list and the dirty bit provide a resource efficient mechanism for performing class loading amongst cyclically dependent classes.

Figure 1:
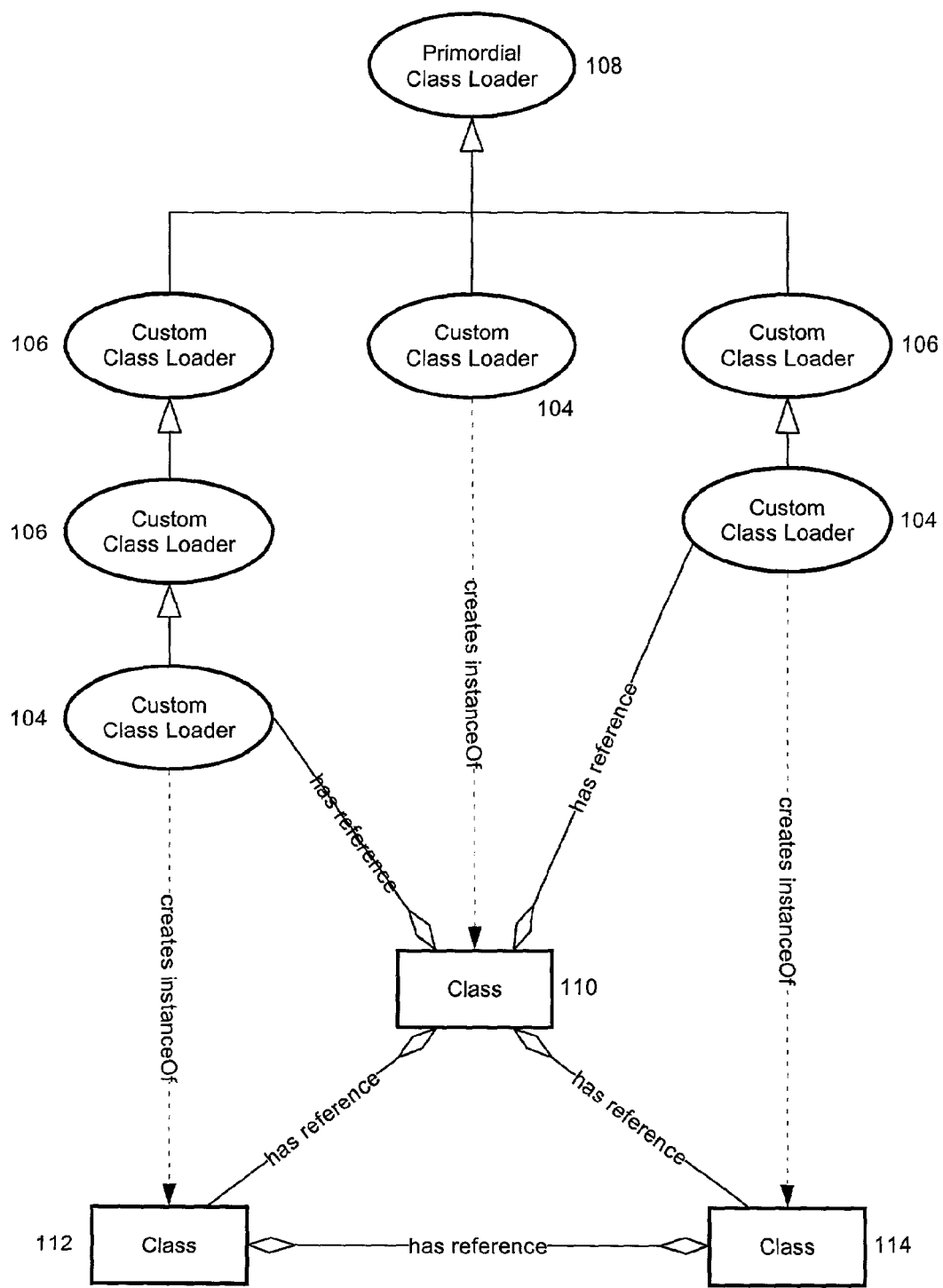
FIG. 1 is an object illustration of a system of cyclically dependent classes and their corresponding class loaders.

FIG. 1 is an object illustration of a system of cyclically dependent classes and their corresponding class loaders. Specifically, one or more custom class loaders 104 can be deployed in a virtual machine. Each custom class loader 104 can conform to the Java 1.2 class loader delegation model, and accordingly, can have one or more parent class loaders 106. Additionally, a virtual machine (not shown) can have a primordial class loader 108. Importantly, each custom class loader 104, 106 also can be viewed as a peer to each other class loader 104, 106 inasmuch as each class loader 104, 106 can load classes 112, 114 which are dependent upon one another.

In accordance with well-known class loading technology, a class 110 can have a reference to one or more of the class loaders 104. Based upon this reference, the class 110 can request instances of other classes 112, 114. Specifically, the class 110 can request of a custom class loader 104 that the custom class loader 104 instantiate an instance of the requested class 112, 114 based only upon a provided class name. The referenced class loader 104 can forward the request to load the class 112, 114 to specified peer class loaders 104, 106, which in turn can forward the request to their peer parent class loaders 104, 106, and so forth in accordance with the dependency specification of the virtual machine.

If none of the peer class loaders 104, 106 and the primordial class loader 108 are able to locate the requested class 112, 114 by class name, the referenced class loader 104 can attempt to locate the requested class 112, 114 using a specific implementation of the well-known findClass( ) method. Of course, where the named class cannot be located, a class not found exception can be processed. Notably, it will be apparent to one skilled in the art that each of the requesting class 110 and the requested classes 112, 114 can be inter-dependent upon one another. More particularly, the requesting class 110 can provide to each requested class 112, 114, references to one another. In this way, it can be said that classes 110, 112 and 114 are cyclically dependent upon one another.

Figure 2:
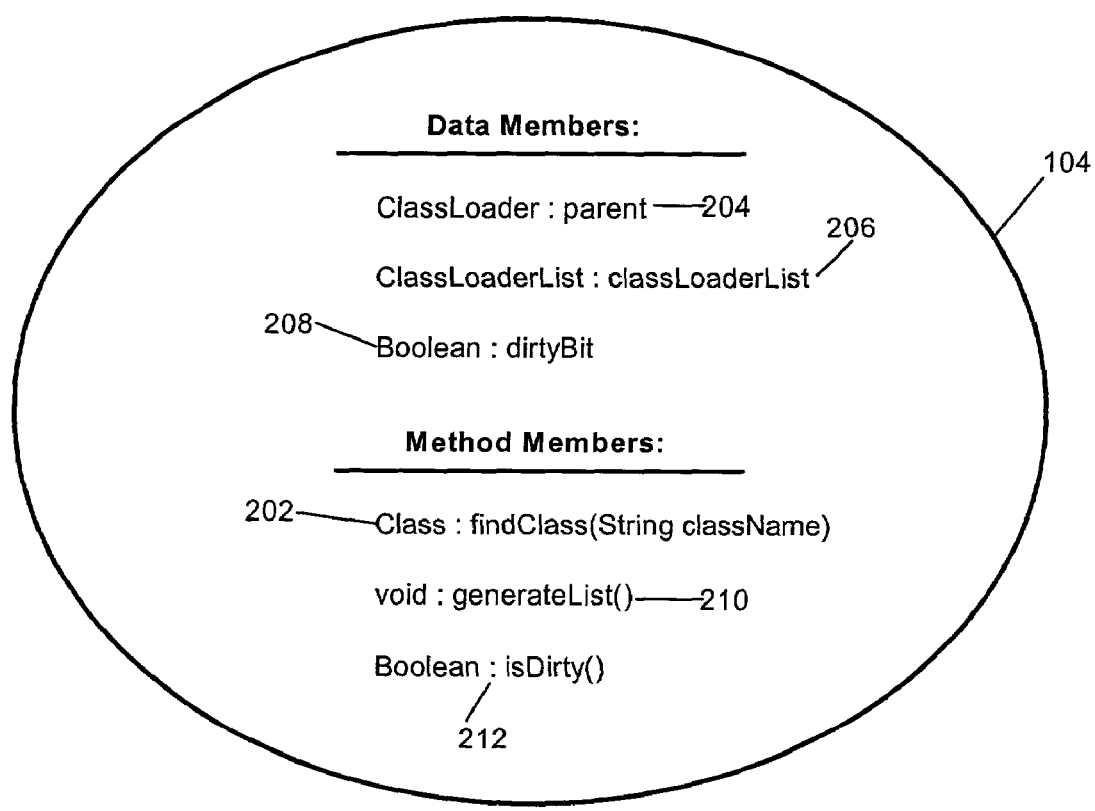
FIG. 2 is a schematic illustration of class loader configured in accordance with the inventive arrangements; and, FIG. 3 is a flow chart illustrating a process for configuring the class loader of FIG. 2.

In order to avoid the inefficiencies and potential errors associated with class loading outside of the dependency specification of the virtual machine 100, each custom class loader 104 (as well as the peer class loaders 104, 106, but excepting the primordial class loader 11) can be configured both with a peer class loader list and a dirty bit. Specifically, as illustrated in FIG. 2, the class loader 104 can include conventional class loading components, for instance a specific implementation of a findClass( ) method 202 as well as a reference to a parent class loader 204. Additionally, the class loader 104 can include a peer class loader list 206 and a dirty bit 208. Finally, the class loader 104 can include one or more methods relating to the peer class loader list 206 and dirty bit 208, for instance a generateList( ) method 210 and an isDirty( ) method 212.

The peer class loader list 206 can include a list of peer class loaders which are to be traversed according to the dependency specification of an application within the virtual machine. The dirty bit 208, by comparison, can indicate both when a class has been replaced, in response to which a new class loader must be created and an associated class loader list 206 generated. In one exemplary aspect of the invention, the isDirty( ) method 212 can expose the status of the dirty bit 208, while the generateList( ) method 210 can provide logic for creating the class loader list 206.

Figure 3:
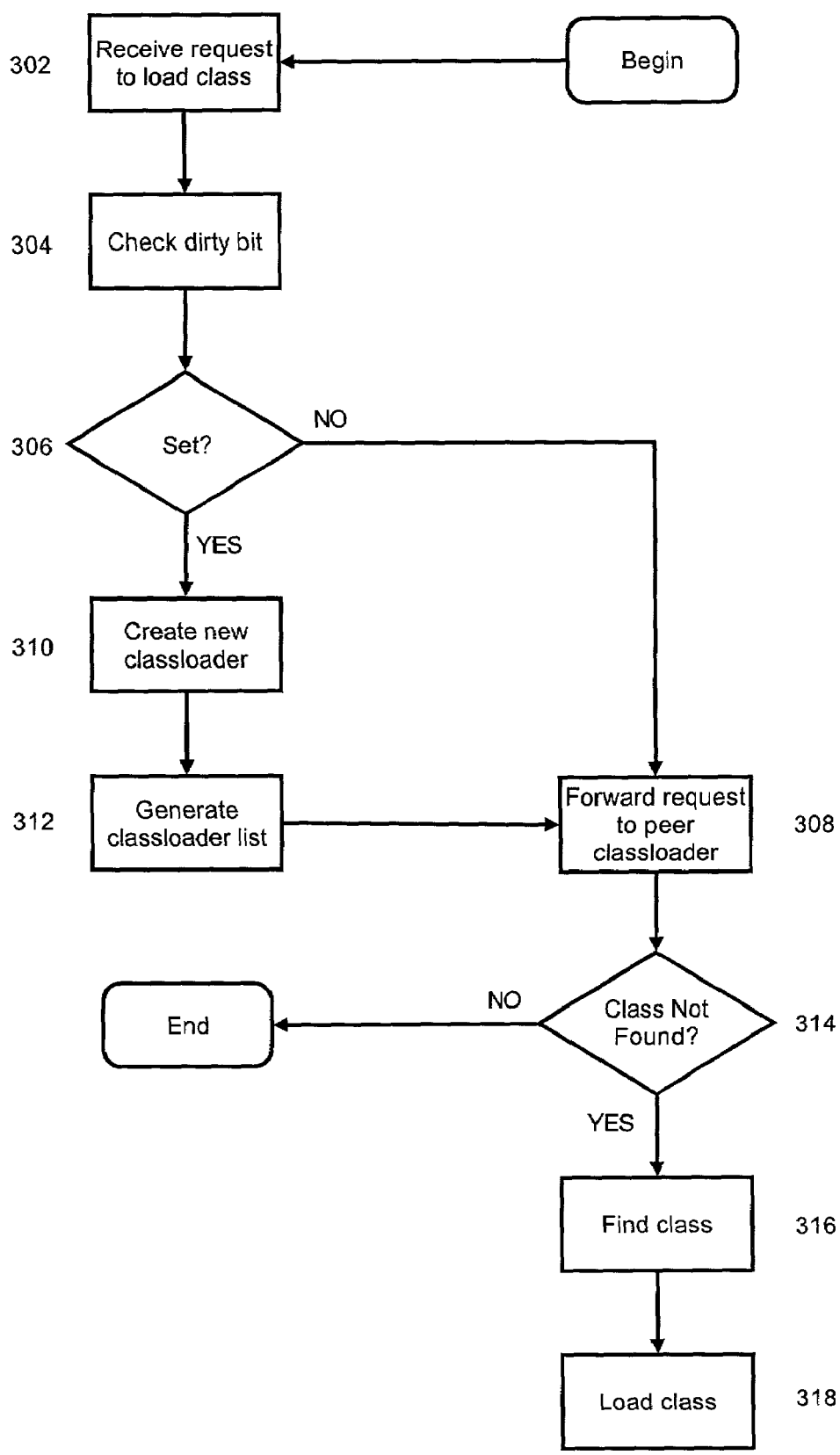

FIG. 3 is a flow chart illustrating a process for configuring the class loader 104 of FIG. 2. Beginning in step 302, the class loader can receive a request to load a specified class by class name. Upon receiving this request, in step 304 the class loader can check the dirty bit of the class loader to determine whether or not the class has been replaced and whether a new class loader list ought to be generated. If in decision step 306 it is determined that the dirty bit has not been set, the request to load the class can be forwarded to a peer class loader in step 308 according to the presently generated class loader list of the class loader.

In contrast, if in decision step 306 it is determined that the dirty bit has been set, assign step 310 a new class loader can be created. Importantly, each time a class loader is encountered with its dirty bit set during the load process, a new class loader can be created. In this way, the creation of the new class loader can be deferred until the load process. In any case, subsequent to the creation of the new class loader in step 310, in step 312 a new class loader list can be generated as described above.

The class loader list can be generated by traversing each class loader in a dependency specification for the application. Specifically, during the initialization of the class loader, a graph can be created having nodes for all modules and dependencies. The dependencies, themselves, can include other modules, or file system paths referenced by the application. The graph can be traversed, preferably using a depth-first algorithm beginning at the node associated with the class loader under study. While traversing the graph, a list can be formed for each node visited. If a node is encountered which either is a leaf node, or a node already referenced in the list, a breadth-first traversal can be undertaken until arriving at the initial node.

Notably, when generating the class loader list, the class loader can utilize the already built class loader list of peer class loaders. In this regard, the traversal process can be expedited. Also, when the dirty bit is set, indicating that a class has been replaced, each class loader in the list also can have its corresponding dirty bit set. In consequence, only those class loaders affected by the replacement of the cyclically dependent class need be recreated.

Regardless of whether the dirty bit has been set, in step 308 the request to load the class can be forwarded to the peer class loader in accordance with the class loader list. In decision step 314, if the peer class loader or loaders are unable to locate the requested class, in step 316 the class loader of the present invention can attempt to locate the requested class by name using a specific implementation of the findClass( ) method. Also, the class loader can attempt to locate the requested class by searching a local list of possible locations for the class. In any case, upon locating the requested class, in step 318 the class loader can load the located class.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A custom class loader apparatus, embodied in a machinereadable storage medium, configured to dynamically locate and load classes in a virtual machine in accordance with an associated dependency specification, the custom class loader comprising:

class loading logic configured to specifically and dynamically locate, define and load a class specified by name;

a list of peer class loaders arranged in accordance with the associated dependency specification and, list generation logic configured to generate said list when said specified class has been replaced or when said dependency specification has been modified;

a flag indicating whether said class has been replaced; and, deference logic configured to defer said location, definition and loading of said specified class to said peer class loaders in said list.

2. The custom class loader apparatus of claim 1, wherein said flag comprises a dirty bit.

3. The custom class loader apparatus of claim 1, wherein said custom class loader conforms to the specification of a Java programming language version 1.2 delegation-style custom class loader.

4. In a custom class loader executing in a virtual machine, a method of coordinating class loading among cyclically dependent classes comprising:

receiving a request to load a specified class;

determining whether said specified class has been replaced;

if it is determined that said specified class has been replaced, constructing a new instance of the class loader and generating a list of peer class loaders to which location, definition and loading of said specified class are to be deferred in accordance with a dependency specification in the virtual machine; and, deferring said location, definition and loading to said peer class loaders in said list.

5. The method of claim 4, wherein said determining step comprises checking a dirty bit in the class loader.

6. The method of claim 5, further comprising setting said dirty bit responsive to said specified class being replaced.

7. The method of claim 6, further comprising setting each dirty bit in each peer class loader referenced in said list responsive to said specified class being replaced.

8. The method of claim 4, wherein said generating step comprises:

traversing each peer class loader in said dependency specification; and, adding a reference for each said traversed peer class loader to said list.

9. The method of claim 8, wherein said generating step further comprises adding at least one reference to a peer class loader to said list based upon a corresponding reference stored in a list of peer class loaders identified in one of said traversed peer class loaders.

10. The method of claim 4, wherein said dependency specification comprises a tree of nodes, each said node encapsulating a reference to a dependency of said specified class, one of said nodes encapsulating a reference to said specified class.

11. The method of claim 10, wherein said generating step comprises:

beginning with said one node encapsulating a reference to said specified class, traversing each node in said dependency specification using a depth-first traversal strategy until encountering either a leaf node or a node encapsulating a reference to a dependency already referenced in said list;

responsive to said encountering, traversing each node in said dependency specification using a breadth-first traversal strategy until encountering said node encapsulating said reference to said specified class; and, adding a reference for each traversed node to said list.

12. A machine readable storage having stored thereon a computer program for coordinating class loading among cyclically dependent classes in a custom class loader executing in a virtual machine, the computer program comprising a routine set of instructions for causing the machine to perform the steps of:

receiving a request to load a specified class;

determining whether said specified class has been replaced;

if it is determined that said specified class has been replaced, constructing a new instance of the class loader and generating a list of peer class loaders to which location, definition and loading of said specified class are to be deferred in accordance with a dependency specification in the virtual machine; and, deferring said location, definition and loading to said peer class loaders in said list.

13. The machine readable storage of claim 12, wherein said determining step comprises checking a dirty bit in the class loader.

14. The machine readable storage of claim 13, further comprising setting said dirty bit responsive to said specified class being replaced.

15. The machine readable storage of claim 14, further comprising setting each dirty bit in each parent class loader referenced in said list responsive to said specified class being replaced.

16. The machine readable storage of claim 12, wherein said generating step comprises:

traversing each peer class loader in said dependency specification; and, adding a reference for each said traversed peer class loader to said list.

17. The machine readable storage of claim 12, wherein said dependency specification comprises a tree of nodes, each said node encapsulating a reference to a dependency of said specified class, one of said nodes encapsulating a reference to said specified class.

18. The machine readable storage of claim 17, wherein said generating step comprises:

beginning with said one node encapsulating a reference to said specified class, traversing each node in said dependency specification using a depth-first traversal strategy until encountering either a leaf node or a node encapsulating a reference to a dependency already referenced in said list;

responsive to said encountering, traversing each node in said dependency specification using a breadth-first traversal strategy until encountering said node encapsulating said reference to said specified class; and, adding a reference for each traversed node to said list.

19. The machine readable storage of claim 12, wherein said generating step comprises:

traversing at least one parent class loader associated with the class loader through to a primordial class loader; and, adding a reference for each said traversed parent class loader to said list.

20. The machine readable storage of claim 19, wherein said generating step further comprises adding at least one reference to a parent class loader to said list based upon a corresponding reference stored in a list of parent class loaders identified in one of said traversed parent class loaders.

* * * * *